United States Patent [19]

Van Leeuwen

[11] 4,114,598

[45] Sep. 19, 1978

[54] SOLAR HEATER AND ELEMENT THEREFOR

[76] Inventor: Egon Van Leeuwen, 35 Richmond St., Blackburn, Victoria, Australia, 3130

[21] Appl. No.: 681,289

[22] Filed: Apr. 28, 1976

[30] Foreign Application Priority Data

Apr. 30, 1975 [AU] Australia .............................. PC1410

[51] Int. Cl.² ............................................... F24J 3/02
[52] U.S. Cl. ...................................... 126/271; 165/76; 165/171
[58] Field of Search ............... 126/270, 271; 237/1 A; 165/76, 171

[56] References Cited

U.S. PATENT DOCUMENTS

| 1,802,635 | 4/1931 | Eaton | 126/271 |
| 2,594,232 | 4/1952 | Stockstill | 165/171 |
| 3,076,450 | 2/1963 | Gough et al. | 126/271 |
| 3,384,167 | 5/1968 | Javkin | 165/171 |

FOREIGN PATENT DOCUMENTS 2,336,247  6/1975  Fed. Rep. of Germany ........... 126/270

Primary Examiner—Kenneth W. Sprague
Assistant Examiner—James C. Yeung
Attorney, Agent, or Firm—Andrus, Sceales, Starke & Sawall

[57] ABSTRACT

The present invention provides a solar heating element comprising a tube having two fin means extending therefrom, the fin means lying at an angle to one another.

The invention also provides solar heaters containing a plurality of such elements joined by connectors at the free ends of the fins.

The elements are conveniently made by extrusion.

Manifolds for attachment to a plurality of such elements are also provided and enable the construction of heaters to various sizes.

15 Claims, 9 Drawing Figures

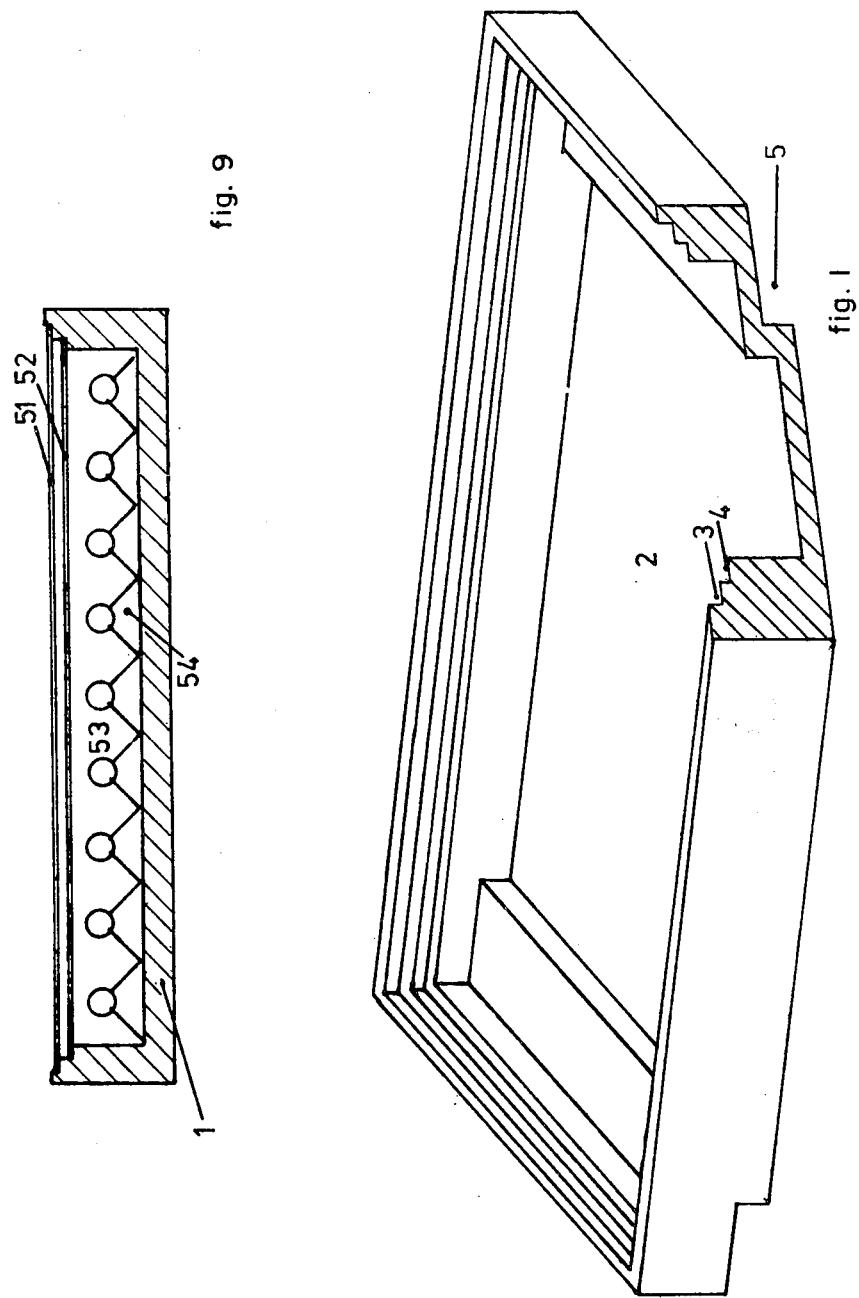

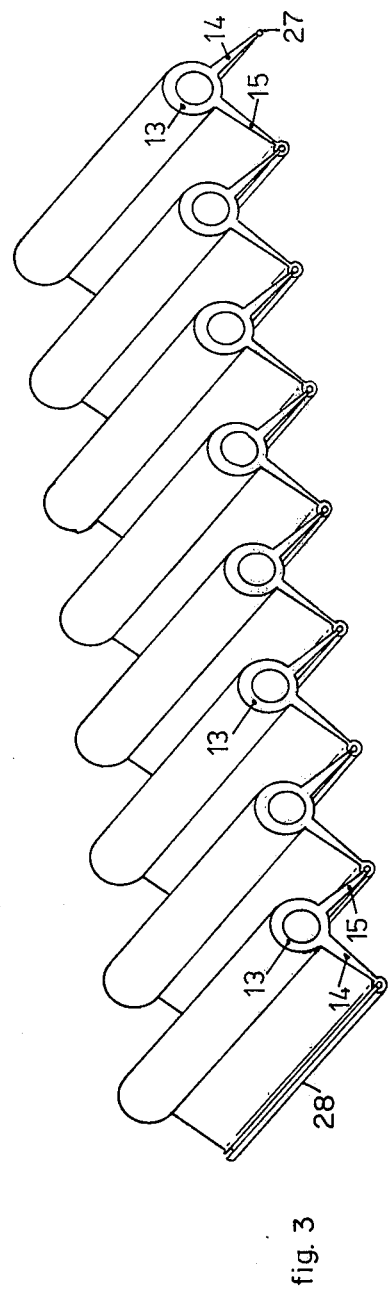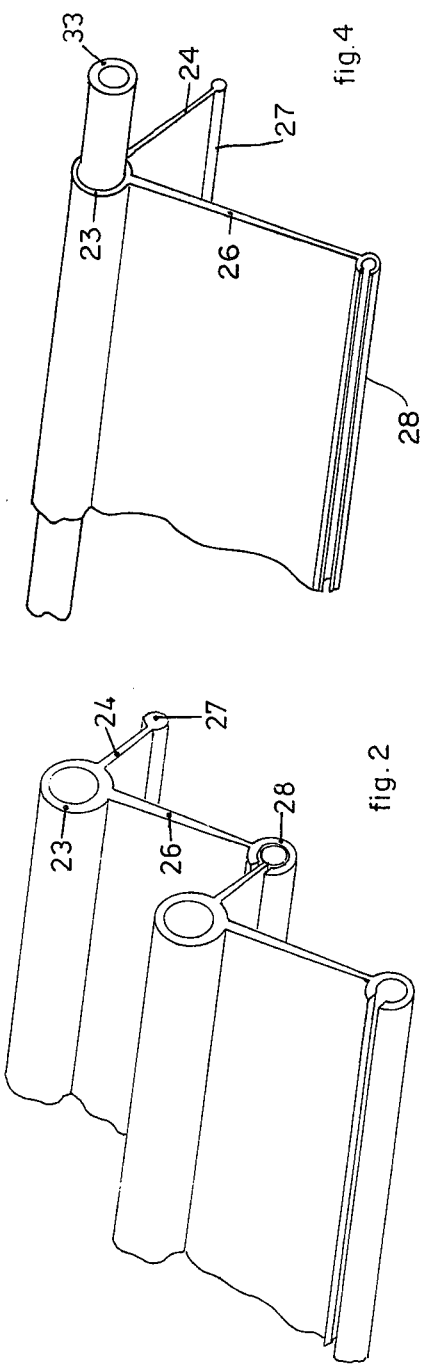

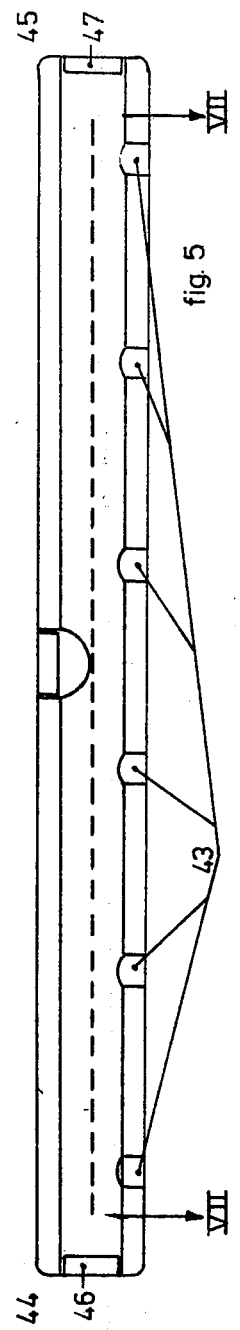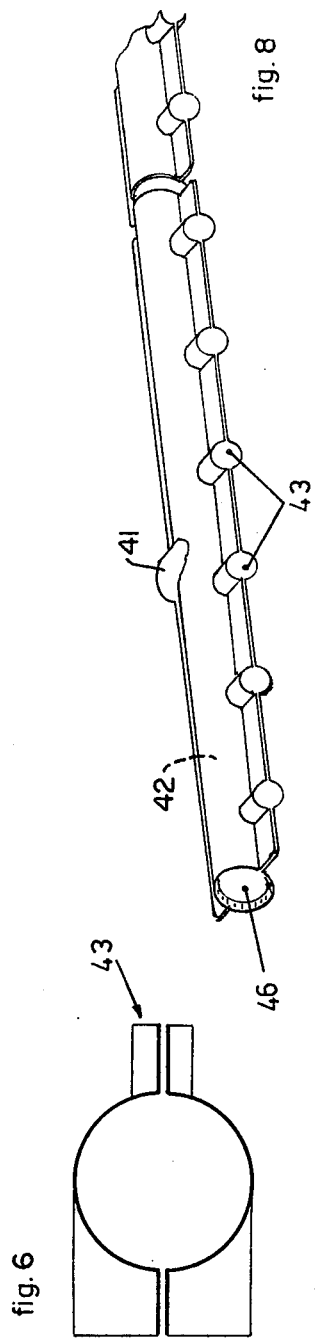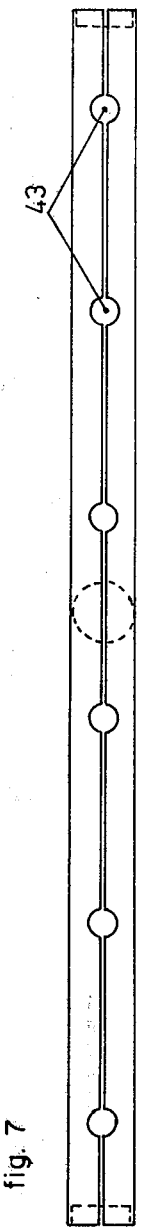

SOLAR HEATER AND ELEMENT THEREFOR

BACKGROUND OF THE INVENTION

1. Field of the Invention

This invention relates to solar heaters and solar heating elements.

2. Description of the Prior Art

It is known to make solar heaters having heat absorbing panels comprised of a sheet of copper to which a copper tube is secured such as by soldering. Although such heaters work exceedingly well, they are expensive in that the manufacture of the panels is expensive.

SUMMARY OF THE INVENTION

The present invention provides a solar heating element comprising a tube having two fin means extending therefrom; the fin means lying at an angle to one another.

The fin means can serve as absorber sheets or plates and so that they will be oriented to receive sun light it is preferred that they be at an angle of from between 0°–180°, more preferably 30°–160°, still more preferably 60°–150°, yet more preferably 75°–120° most preferably 90°. However, it is to be noted that the choice of the actual angle may be influenced by the latitude at which the element is to be used and the surface finish of the element.

The fin means can also serve to support the tube above a solar heat absorber tray or base and will entrap air beneath the fin means which will act as insulation.

The solar heating element may be integrally formed in one piece or may be formed by assemblage or fabrication. In the former instance manufacture by extrusion is preferred.

The present invention also provides a solar heater comprising a plurality of such solar heater elements.

The present invention also provides a solar heat absorber unit for inclusion in a solar heater comprising a plurality of such solar heater elements secured together. The free ends of the fin means are provided with complementary formations whereby adjacent elements can be joined through said complementary formations on adjacent fin means.

The tube may have a synthetic plastics or metal liner or lining. This is convenient if the tube is made of a metal which might electrolytically react with another metal used in conjunction with the solar heater.

A manifold is preferably provided into which, or which into, the tubes of the elements can press-fittingly engage. The manifold can be made of two or more parts which can be assembled together and to the tubes. The manifold is conveniently made of synthetic plastics material; preferably by moulding. The manifold may also be made from metal and if necessary a liner or lining to prevent electrolytic attack may be used.

A tray for the solar heater is conveniently made of synthetic plastics material. The material is preferably a foam material for insulation purposes and suitable foam materials include foamed polystyrene and polyurethane.

The tray may have steps for locating glass or the like sheets to retain heat. The tray may also have recesses in a base thereof to facilitate mounting on a frame.

Specific embodiments of this invention will now be described with the aid of the accompanying drawings.

BRIEF DESCRIPTION OF THE VIEWS OF THE DRAWINGS

FIG. 1 is a perspective view of a solar heater tray,
FIG. 2 is a perspective view of a solar heater element,
FIG. 3 is a perspective view of a plurality of solar heater elements,
FIG. 4 is a perspective view of the element shown in FIG. 3,
FIG. 5 is a plan view of a manifold,
FIG. 6 is an end view of the manifold,
FIG. 7 is a cross-section through the manifold on line VII—VII in FIG. 5,
FIG. 8 is a perspective view of the manifold, and
FIG. 9 is a cross-section through a solar heater.

DETAILED DESCRIPTION

In FIG. 1 is shown a tray for a solar heater. The tray is made of foamed synthetic plastics material. The tray has a bottom 2, two steps 3 and 4 on which glass or other sheet can be mounted and recesses 5 which can serve to locate the tray on a support.

The solar heating element shown in FIG. 2 is of extruded metal or synthetic plastics material and comprises a tube 23 and two fins 24 and 26 which lie at 90° to one another. In certain latitudes an angle of other than 90° may be more appropriate.

The solar heater absorber unit shown in FIG. 3 is similar to the element shown in FIG. 2 but comprises a plurality of elements each comprising a tube 23 and fins 24 and 26 which are integrally formed as a unit. The unit may comprise as many elements as may be desired. The fin 24 is provided with a male complementary formation 27 and the fin 26 is provided with a female complementary formation 28 which enables the element to be joined to a similar element as shown.

The element shown in FIG. 2 is to be noted as being formed of material which is thicker in some regions than in others. The reason for this is to promote heat transfer in that the material is thickest in those regions conducting most heat.

The solar heating element shown in FIG. 4 is similar to that shown in FIG. 2 but has a liner tube 33. The liner 33 can serve to protect against electrolytic corrosion in cases when tube 23 is of a metal incompatible with another metal used in a solar heater.

FIGS. 5–8 are views of the manifold. The manifold has a primary inlet or outlet 41, a body cavity 42 and secondary outlets or inlets 43.

The manifold is made of two identical pressed sheets which are held together in some suitable way such as by thermal bonding or by rivets with, if necessary, the use of a sealant and/or a liner or lining to inhibit electrolytic reaction. It is also to be noted that the two identical sheets of the manifold are open at the ends 44 and 45 and a number of such manifolds may be connected at those ends to make a larger manifold or the ends 44 and 45 may be closed in some suitable way such as by plugs 46 and 47.

The outlets or inlets 43 are received within or receive the tubes of the before described solar heating elements or solar heater absorber unit to form a panel provided with inlet and outlet manifolds for incorporation into a solar heat absorber.

In FIG. 9 is shown a cross-section through a solar heater which comprises the tray 1, two sheets of glass or other suitable sheet 51 and 52 which are located on the steps 3 and 4 (one of which sheets may be omitted if desired) and a solar heat absorber unit 53. The unit 53 is made up of elements or units as described above with respect to FIGS. 2-4, and manifolds as in FIGS. 5-8. Apertures may be made in the tray to provide access to the primary outlet or inlet of the manifold.

Because of the orientation of the fins of the elements or units which go to make up unit 53, the absorption of solar heat is facilitated and, in addition, an insulating air space 54 will be present although in instances where this is not desired the bottom of the tray may have a similar shaping to the underside of the unit 53.

The above described solar heater is considered to be considerably more economical to manufacture than certain previously proposed heaters and, although the use of extruded elements having comparatively thicker walls than fabricated units, the use of extruded aluminium as a preferred material and liners or lining to inhibit electrolytic effects do take away from the efficiency of the unit, the savings in cost are considered to outweight these disadvantages.

Further, the nature of the construction of the solar heater enables it to be supplied in kit form and by the use of extrusions it can be made, within practical limits, to any desired size.

The elements of the solar heater may be coated to improve heat absorption and various selective coatings are known for this purpose.

Modifications and adaptions may be made to the above described without departing from the spirit and scope of this invention which includes every novel feature and combination of features disclosed herein.

The claims form part of the disclosure of this Specification.

I claim:

1. A solar fluid heater including a plurality of elongated solar heating elements formed by extrusion and positioned in a sealed tray for exposure to the sun; each of said heating elements comprising a tube for receiving and passing the fluid to be heated, a pair of fins of similar dimensions integrally formed with said tube and extending in a generally radial direction from the exterior of the tube to subtend a predetermined angle therebetween, said fins having a dimension in the generally radial direction sufficient to support the element on the bottom of the tray while spacing said tube from the bottom of the tray, complementary formation connection means carried by the free ends of said fins for connecting adjacent elements together in a generally parallel unitary configuration, said complementary formation connection means comprising a rod mounted at the free edge of one of said fins and running parallel to said fluid passage tube, and a second tube mounted at the free edge of the other of said fins and running parallel to said fluid passage tube for embracing the rod of an adjacent element, said second tube having a peripheral portion cut away for receiving the one of said fins of said adjacent element when the rod thereof lies in said second tube, and manifold means connecting the ends of said tubes for passing fluids down said tubes.

2. The solar fluid heater of claim 1 wherein said fins vary in thickness in the radial direction.

3. The solar fluid heater of claim 2 wherein said fins are tapered toward their free ends.

4. The solar fluid heater as claimed in claim 1 wherein said fins subtend an angle of less than 180° between each other.

5. The solar fluid heater as claimed in claim 4 wherein said fins subtend an angle of from 75° to 120° between each other.

6. The solar fluid heater as claimed in claim 1 wherein said manifold means includes first and second manifolds connected to opposite ends of said fluid passage tubes.

7. The solar fluid heater as claimed in claim 1 wherein said elements are made of aluminum.

8. A solar heater as claimed in claim 1 wherein said tray is formed of foamed synthetic plastics material.

9. A solar fluid heating element formed by extrusion and positionable on a substrate, said heating element comprising an elongated tube for receiving and passing the fluid to be heated, a pair of fins of similar dimensions integrally formed with said tube and extending in a generally radial direction from the exterior of the tube to subtend a predetermined angle therebetween, said fins having a dimension in the generally radial direction sufficient to support the element when placed on a substrate while spacing tube therefrom, and complementary formation connection means carried by the free end of each of said fins connectable to corresponding means on adjacent elements, said complementary formation connection means comprising a rod mounted at the free edge of one of said fins and running parallel to said fluid passage tube, and a second tube mounted at the free edge of the other of said fins and running parallel to said fluid passage tube for embracing the rod of an adjacent element, said second tube having a peripheral portion cut away for receiving the one of said fins of an adjacent element when the rod thereof lies in said second tube.

10. The solar fluid heating element according to claim 9 wherein said fins vary in thickness in the radial direction.

11. The solar fluid heating element according to claim 10 wherein said fins taper toward their free ends.

12. The solar fluid heating element as claimed in claim 9 wherein said fins subtend an angle of less than 180° between each other.

13. The solar fluid heating element as claimed in claim 12 wherein said fins subtend an angle of from 75° to 120° between each other.

14. The solar fluid heating element as claimed in claim 9 wherein said element is made of aluminum.

15. The solar fluid heating element as claimed in claim 9 further defined as an assemblable kit comprising a plurality of such elements.

* * * * *